1. United States Patent
Oki et al.

(10) Patent No.: US 8,852,740 B2
(45) Date of Patent: *Oct. 7, 2014

(54) ELECTRODE ACTIVE MATERIAL AND ELECTRODE ACTIVE MATERIAL PRODUCTION METHOD

(75) Inventors: Hideki Oki, Toyota (JP); Toshihiro Seguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/634,123

(22) PCT Filed: Mar. 12, 2010

(86) PCT No.: PCT/JP2010/054243
§ 371 (c)(1),
(2), (4) Date: Oct. 4, 2012

(87) PCT Pub. No.: WO2011/111228
PCT Pub. Date: Sep. 15, 2011

(65) Prior Publication Data
US 2013/0022815 A1    Jan. 24, 2013

(51) Int. Cl.
B32B 5/16    (2006.01)

(52) U.S. Cl.
USPC ........ 428/402; 428/403; 428/404; 423/594.6; 427/283; 427/419.3

(58) Field of Classification Search
USPC ........ 428/402, 403, 404; 423/594.6; 427/283, 427/419.3
See application file for complete search history.

(56) References Cited

U.S. PATENT DOCUMENTS

| 6,953,566 B2 * | 10/2005 | Ramasamy et al. ....... 423/594.6 |
| 7,740,982 B2 * | 6/2010 | Yoshizawa et al. ........ 429/218.1 |
| 2001/0024754 A1 | 9/2001 | Fukuzawa et al. |
| 2005/0281727 A1 | 12/2005 | Yoshizawa et al. |
| 2009/0278082 A1 | 11/2009 | Takebayashi et al. |
| 2009/0305132 A1 * | 12/2009 | Gauthier et al. ............. 429/207 |
| 2010/0297504 A1 * | 11/2010 | Oki et al. ................. 429/231.95 |

FOREIGN PATENT DOCUMENTS

| CN | 1694286 | * | 11/2005 |
| CN | 101409346 A | | 4/2009 |
| JP | A-2001-250549 | | 9/2001 |
| JP | A-2002-087824 | | 3/2002 |
| JP | A-2002-154823 | | 5/2002 |
| JP | A-2005-522832 | | 7/2005 |
| JP | A-2006-032321 | | 2/2006 |
| JP | A-2006-286240 | | 10/2006 |
| JP | A-2007-257885 | | 10/2007 |
| JP | A-2008-542979 | * | 11/2008 |
| JP | 2009-110952 | * | 5/2009 |
| JP | A-2009-110952 | | 5/2009 |
| JP | A-2011-001256 | | 1/2011 |
| WO | WO 03/086975 A1 | | 10/2003 |

OTHER PUBLICATIONS

International Search Report issued in Application No. PCT/JP2010/054243; Dated Apr. 27, 2010 (With Translation).
Sep. 5, 2012 Office Action issued in U.S. Appl. No. 12/784,796.
Jan. 4, 2013 Office Action issued in U.S. Appl. No. 12/784,796.
Nov. 5, 2013 Notice of Allowance issued in U.S. Appl. No. 12/784,796.
Feb. 21, 2014 Office Action issued in U.S. Appl. No. 12/784,796.

* cited by examiner

Primary Examiner — Leszek Kiliman
(74) Attorney, Agent, or Firm — Oliff PLC

(57) ABSTRACT

An electrode active material including a lithium-transition metal complex oxide having a layered rock salt structure or spinel structure and a fluorine and nitrogen introduced therein. Also disclosed is an electrode active material production method including a nitrogen introduction step of synthesizing a lithium-transition metal complex oxide (c) having a layered rock salt structure or spinel structure and a fluorine and nitrogen introduced therein, by firing a material composition including a lithium-transition metal complex oxide (a) having a fluorine introduced therein and a nitriding agent (b) being represented by the formula (1) and being solid or liquid at ordinary temperature.

14 Claims, 2 Drawing Sheets

ELECTRODE ACTIVE MATERIAL AND ELECTRODE ACTIVE MATERIAL PRODUCTION METHOD

TECHNICAL FIELD

The present invention relates to an electrode active material and an electrode active material production method.

BACKGROUND ART

In recent years, with the rapid spread of IT- and communication-related devices such as personal computers, camcorders and cellular phones, much attention has been focused on the development of batteries which are used as their power sources. Also in the automobile industry, high-power and high-capacity batteries for electric vehicles and hybrid vehicles are under development. Among various kinds of secondary batteries, a lithium secondary battery is drawing attention due to its high energy density and high power output.

A general lithium secondary battery comprises a positive electrode active material layer comprising a positive electrode active material, a negative electrode active material layer comprising a negative electrode active material, and an electrolyte layer present between the positive and negative electrode active material layers. More specifically, there may be mentioned a lithium secondary battery as shown in FIG. 2, for example. In lithium secondary battery 100 shown in FIG. 2, positive electrode active material layer 2 is present inside positive electrode can 1. Negative electrode active material layer 4 is present on positive electrode active material layer 2 via electrolyte layer 3. Negative electrode active material layer 4 is filled inside negative electrode cap 5 and the cap is set in positive electrode can 1, thus forming a battery structure of positive electrode active material layer 2-electrolyte layer 3-negative electrode active material layer 4. The inside of positive electrode can 1 and that of negative electrode cap 5 are kept airtight with gasket 6.

As the electrode active material of a lithium secondary battery, for example, as the positive electrode active material, $LiCoO_2$, $LiMnO_2$, $LiMn_2O_4$, $LiNiO_2$, $LiCoMnO_4$ or the like is used, while $Li_4Ti_5O_{12}$ or the like is used as the negative electrode active material. These conventionally-used electrode active materials have a low electron conductivity problem. Therefore, in combination with the electrode active material, a material with high electron conductivity, such as acetylene black or graphite, is generally used as an electron conduction assisting material, in order to ensure electron conductivity of an active material layer. Also, a binder component is sometimes used to bind the electrode active material to the electron conduction assisting material. However, the electron conduction assisting material such as a carbonaceous material and the binder component do not contribute to the capacity of a battery, so that they are one factor which decreases the energy density of a battery.

Therefore, various techniques have been proposed to increase electron conductivity of the electrode active material (for example, patent literature 1). Patent literature 1 discloses a method for producing an active material, in which a nitrogen oxide with a resistivity of less than $1\times10^4$ Ωcm and represented by the composition formula $Li_xMeO_yN_z$ (wherein $0 \leq x \leq 2$; $0.1 < y < 2.2$; $0 < z < 1.4$; and Me is at least one kind selected from the group consisting of Ti, Co, Ni, Mn, Si, Ge and Sn) is obtained by heating an oxide with a reactivity of $1\times10^4$ Ωcm or more in a reducing atmosphere and then reacting the oxide with ammonia gas.

A method for (not producing an electrode active material but) nitriding an oxide with a nitrogen compound such as urea is also known. For example, patent literature 2 discloses a method for producing an inorganic oxynitride with photocatalytic activity by heating a mixture of an oxide with a given specific surface area (e.g., titanium oxide, zinc oxide, tin oxide, iron oxide) and a nitrogen compound which adsorbs to the oxide at ordinary temperature (e.g., urea).

CITATION LIST

Patent Literature 1: Japanese Patent Application Laid-Open (JP-A) No. 2006-032321
Patent Literature 2: JP-A No. 2002-154823

SUMMARY OF INVENTION

Technical Problem

In the nitriding method with ammonia as disclosed in patent literature 1, however, nitriding reaction is not sufficiently promoted and there is a limit to increase in electron conductivity. Also, as a result of diligent researches, the inventors of the present invention found that in the case where nitrogens are introduced in an electrode active material comprising a lithium—transition metal complex oxide to replace oxygens in the active material with the nitrogens and increase electron conductivity, the crystal structure of the electrode active material is collapsed when an excess amount of nitrogens are introduced therein. A decrease in crystallinity of the lithium-transition metal complex oxide can cause disadvantages such as a decrease in reversibility of insertion/extraction of lithium ions and a decrease in electrode potential. Accordingly, there is a demand for an electrode active material which has stable lithium ion insertion/extraction properties and stable redox potential, with maintaining its crystal structure, and also which shows excellent electron conductivity.

The present invention was achieved in consideration of the circumstances. An object of the present invention is to provide an electrode active material which has excellent electron conductivity with maintaining its crystal structure.

Solution to Problem

The electrode active material of the present invention comprises a lithium-transition metal complex oxide having a layered rock salt structure or spinel structure and a fluorine and nitrogen introduced therein.

The electrode active material of the present invention is a lithium-transition metal complex oxide having as dopants a nitrogen, which is an acceptor species, and a fluorine, which is a donor species, introduced therein. As just described, by replacing a part of oxygens in the lithium-transition metal complex oxide with nitrogens and fluorines, it is possible to introduce more nitrogens in the lithium-transition metal complex oxide than the case of replacing a part of oxygens with nitrogens only, and it is thus possible to increase the electron conductivity of the lithium-transition metal complex oxide, with maintaining the crystal structure of the lithium-transition metal complex oxide.

As the lithium-transition metal complex oxide, for example, there may be mentioned at least one kind selected from the group consisting of $LiCoO_2$, $LiNiO_2$, $Li(Ni, Mn)O_2$, $Li(Ni, Mn, Co)O_2$ and $LiMn_2O_4$.

As the lithium transition metal complex oxide, lithium cobalt oxide ($LiCoO_2$) is particularly suitable.

According to the present invention, it is possible to obtain an electrode active material having an electron conductivity of $1.0\times10^{-3}$ S/cm or more.

In the present invention, the electrode active material preferably has an average particle diameter of 0.1 μm to 50 μm.

The electrode active material of the present invention is particularly useful as a positive electrode active material.

The electrode active material production method of the present invention comprises a nitrogen introduction step of synthesizing a lithium-transition metal complex oxide (c) having a layered rock salt structure or spinel structure and a fluorine and nitrogen introduced therein, by firing a material composition comprising a lithium-transition metal complex oxide (a) having a fluorine introduced therein and a nitriding agent (b) being represented by the following formula (1) and being solid or liquid at ordinary temperature:

[Chemical Formula 1]

Formula (1)

wherein $R^1$, $R^2$ and $R^3$ are each independently a group having at least one selected from the group consisting of carbon (C), hydrogen (H), oxygen (O) and nitrogen (N).

According to the electrode active material production method of the present invention, it is possible to easily obtain an electrode active material which has stable lithium ion insertion/extraction properties and redox potential, and also which shows excellent electron conductivity.

As the lithium-transition metal complex oxide (a) having a fluorine introduced therein, there may be mentioned at least one kind of lithium-transition metal complex oxide being selected from the group consisting of $LiCoO_2$, $LiNiO_2$, $Li(Ni, Mn)O_2$, $Li(Ni, Mn, Co)O_2$ and $LiMn_2O_4$, and having a fluorine introduced therein.

As the lithium transition metal complex oxide having a fluorine introduced therein, lithium cobalt oxide ($LiCoO_2$) having a fluorine introduced therein is particularly suitable.

The electrode active material production method of the present invention can comprise a fluorine introduction step of synthesizing the lithium-transition metal complex oxide (a) having a fluorine introduced therein, by firing a material comprising a lithium element, a transition metal element, a fluorine element and an oxygen element.

At this time, for example, a material mixture comprising at least a lithium compound, a fluorine compound and a transition metal compound can be used as the material. As the lithium compound, there may be mentioned at least one kind selected from the group consisting of lithium carbonate, lithium hydroxide, lithium nitrate, lithium oxide, and lithium acetate. As the fluorine compound, there may be mentioned lithium fluoride. As the transition metal compound, there may be mentioned at least one kind selected from the group consisting of cobalt oxide, cobalt carbonate, cobalt nitrate, cobalt acetate and cobalt hydroxide.

As the nitriding agent, there may be mentioned at least one kind selected from the group consisting of urea, methylamine, ethylamine, diethylamine, triethylamine, aniline, nicotine and cyclohexylamine.

In the nitrogen introduction step, the firing is preferably carried out at a temperature of 300° C. to 600° C.

In the fluorine introduction step, the firing is preferably carried out at a temperature of 500° C. to 900° C.

Preferably, the electrode active material production method of the present invention further comprises a nitriding agent removal step of removing the nitriding agent still remaining by heating the lithium-transition metal complex oxide (c) having a fluorine and nitrogen introduced therein after the nitrogen introduction step.

Advantageous Effects of Invention

According to the present invention, it is possible to obtain an electrode active material which has stable lithium ion insertion/extraction properties and redox potential, and also which shows excellent electron conductivity. Therefore, by using the electrode active material of the present invention, it is possible to decrease the ratio of the electron conduction assisting material in the electrode active material layer comprising a battery and it is thus possible to increase the energy density of a battery.

DESCRIPTION OF EMBODIMENTS

Figure 1:
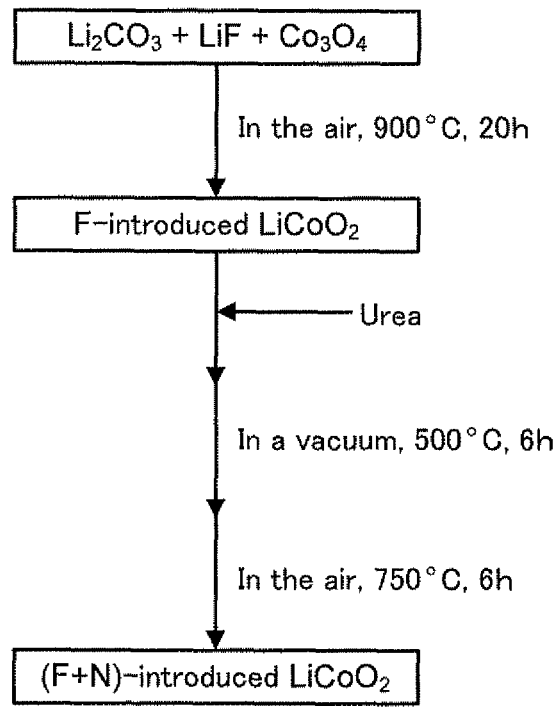
FIG. 1 is a view showing an embodiment of the electrode active material production method of the present invention.

The electrode active material of the present invention comprises a lithium-transition metal complex oxide having a layered rock salt structure or spinel structure and a fluorine and nitrogen introduced therein.

As a result of diligent researches to increase electron conductivity of a lithium-transition metal complex oxide which has a layered rock salt structure or spinel structure and is used as an electrode active material, the inventors of the present invention found the following: in the case of introducing nitrogens (N) in the lithium-transition metal complex oxide to replace a part of oxygens (O) therewith, the crystal structure of the lithium-transition metal complex oxide becomes unstable and collapses when an excess amount of nitrogens are introduced. Problems arise once the crystal structure is collapsed, such as a decrease in reversibility of insertion/extraction of Li ions and a decrease in electrode potential. The reason for the collapse of the crystal structure by the introduction of an excess amount of nitrogens, is because the balance of valence is disrupted by introducing a nitrogen having a valence of −3 in the site of an oxygen ion having a valence of −2.

Then, the inventors of the present invention found that it is possible to introduce a large amount of nitrogens, with maintaining the crystal structure of the lithium-transition metal complex oxide, by introducing a nitrogen having a valence of −3, which is an acceptor species, and a fluorine having a valence of −1, which is a donor species, in the lithium-transition metal complex oxide. That is, the electrode active material of the present invention comprising the lithium-transition metal complex oxide having a layered rock salt structure or spinel structure and a fluorine and nitrogen introduced therein, has excellent electron conductivity, with maintaining its Li ion insertion/extraction properties and electrode potential.

In the present invention, it is possible to judge whether fluorines and nitrogens are introduced in the lithium-transition metal complex oxide having a layered rock salt structure or spinel structure (doping), that is, whether a part of oxygens in the lithium-transition metal complex oxide is replaced with fluorines and oxygens, from $N_{1s}$ and $F_{1s}$ spectra obtained by an XPS measurement.

The crystal structure of the lithium-transition metal complex oxide can be determined by an XPS measurement. In the below-described electrode active material production method of the present invention, it is also possible to confirm whether the crystal structure of the lithium-transition metal complex oxide (a) having a fluorine introduced therein is maintained in the lithium-transition metal complex oxide (c) having a fluorine and nitrogen introduced therein, by confirming the crystal structure of the lithium-transition metal complex oxide (a), which is used as a raw material, and then comparing the crystal structure of the lithium-transition metal complex oxide (a) with that of the lithium-transition metal complex oxide (c).

According to the present invention, it is possible to obtain an electrode active material with excellent electron conductivity. That is, it is possible to obtain an electrode active material having an electron conductivity of $1.0 \times 10^{-3}$ S/cm or more, what is more, an electrode active material having an electron conductivity of $5.0 \times 10^{-2}$ S/cm or more. The electron conductivity of the electrode active material can be measured with a powder resistivity measurement device (such as MCP-PD51 manufactured by Mitsubishi Chemical Analytech Co., Ltd.), for example.

By using the electrode active material having such an excellent electron conductivity of the present invention in a battery such as a lithium secondary battery, it becomes possible to decrease the amount of an electron conduction assisting material in an electrode active material layer or to form an electrode active material layer without the use of an electron conduction assisting material. As a result, it is possible to increase the ratio of the electrode active material in the electrode active material layer and to increase the energy density of a battery.

In the present invention, the lithium-transition metal complex oxide having a layered rock salt structure or spinel structure is not particularly limited. However, for instance, as the lithium-transition metal complex oxide having a layered rock salt structure, there may be mentioned compounds represented by the following general formula (2), for example:

General Formula (2): $Li_aM_bO_c$ wherein M is at least one kind of transition metal element, and a to c satisfy $0<a\leq 1.3$, $0.7\leq b\leq 1.3$ and $1.5\leq c\leq 2.5$.

In the general formula (2), b preferably satisfies $0.8\leq b\leq 1.2$, more preferably $0.9\leq b\leq 1.1$; moreover, c preferably satisfies $1.4\leq c\leq 2.3$, more preferably $1.6\leq c\leq 2.1$.

Also in the general formula (2), M is preferably at least one kind selected from the group consisting of Mn, Co, Ni, V, Cr and Ti for example, more preferably at least one kind selected from the group consisting of Mn, Co and Ni, still more preferably Co. This is because it is possible to obtain an electrode active material with more excellent electron conductivity.

As the lithium-transition metal complex oxide having a layered rock salt structure, specifically, there may be mentioned $Li(Ni, Mn, Co)O_2$ such as $LiCoO_2$, $LiNiO_2$, $LiMnO_2$, $Li(Ni, Mn)O_2$ and $LiCo_{1/3}Ni_{1/3}Mn_{1/3}O_2$, and $LiVO_2$ and $LiCrO_2$. It is preferably at least one kind selected from the group consisting of $LiCoO_2$, $LiNiO_2$, $Li(Ni, Mn)O_2$, $Li(Ni, Mn, Co)O_2$ and $LiMnO_2$, more preferably at least one kind selected from the group consisting of $LiCoO_2$, $LiNiO_2$, $Li(Ni, Mn)O_2$ and $Li(Ni, Mn, Co)O_2$, and still more preferably $LiCoO_2$.

As the lithium-transition metal complex oxide having a spinel structure, for example, there may be mentioned compounds represented by the following general formula (3):

$$Li_aM_bO_c \qquad \text{General Formula (3)}$$

wherein M is at least one kind of transition metal element, and a to c satisfy $0<a\leq 2.0$, $1.5\leq b\leq 2.5$ and In the general formula (3), b preferably satisfies more preferably moreover, c preferably satisfies $3.5\leq c\leq 4.5$, more preferably $3.2\leq c\leq 4.2$. Also in the general formula (3), M is preferably at least one kind selected from the group consisting of Mn, Co, Ni, V, Cr and Ti for example, more preferably at least one kind selected from the group consisting of Mn, Co and Ni, still more preferably Co. This is because it is possible to obtain an electrode active material with more excellent electron conductivity.

As the lithium-transition metal complex oxide having a spinel structure, specifically, there may be mentioned $Li(Ni_xMn_y)O_4$ such as $LiMn_2O_4$, $LiCoMnO_4$ and $LiNi_{0.5}Mn_{1.5}O_4$, $LiCo_{0.5}Mn_{1.5}O_4$, $LiFe_{0.5}Mn_{1.5}O_4$ and $LiCu_{0.5}Mn_{1.5}O_4$, for example. Preferred is $LiMn_2O_4$.

In the present invention, the amount of fluorines and nitrogens introduced in the lithium-transition metal complex oxide having a layered rock salt structure or spinel structure, is not particularly limited. It is only needed that the amount of nitrogens (acceptor species) differs from the amount of fluorines (donor species).

The electrode active material of the present invention can be in the form of particles (powder) or in the form of a thin film; however, it is preferably in the form of particles. When the electrode active material is in the form of particles, unlike a thin film, peeling and cracks do not occur and excellent durability is obtained. The average particle diameter of the particulate electrode active material is preferably 100 nm or more, more preferably 2 μm or more, still more preferably 4 μm or more, while it is preferably 100 μm or less, more preferably 50 μm or less, still more preferably 20 μm or less. The average particle diameter of the electrode active material can be calculated with a laser diffraction particle size distribution analyzer.

The specific surface area of the electrode active material of the present invention is preferably 0.1 m²/g or more, more preferably 0.5 m²/g or more, while it is preferably 300 m²/g or less, more preferably 100 m²/g or less. The specific surface area of the electrode active material can be calculated by the BET method (gas adsorption method).

The electrode active material of the present invention can be used as a positive or negative electrode active material, depending on the combination with an electrode active material of the counter electrode. In general, it is suitably used as a positive electrode active material. Especially in the case where the lithium-transition metal complex oxide is represented by the above formula (2) or (3), it is suitably used as a positive electrode active material when M is at least one kind selected from the group consisting of Mn, Co and Ni, especially when M is Co.

Next, the electrode active material production method of the present invention will be explained. The above-described electrode active material of the present invention can be synthesized by the electrode active material production method of the present invention described below. However, the electrode active material of the present invention can be produced by methods other than the one described below.

The electrode active material production method of the present invention comprises a nitrogen introduction step of synthesizing a lithium-transition metal complex oxide (c) having a layered rock salt structure or spinel structure and a fluorine and nitrogen introduced therein, by firing a material composition comprising a lithium-transition metal complex oxide (a) having a fluorine introduced therein and a nitriding agent (b) being represented by the following formula (1) and being solid or liquid at ordinary temperature:

[Chemical Formula 2]

Formula (1)

wherein $R^1$, $R^2$ and $R^3$ are each independently a group having at least one selected from the group consisting of carbon (C), hydrogen (H), oxygen (O) and nitrogen (N).

According to the present invention, it is possible to easily obtain a lithium-transition metal complex oxide which has stable lithium ion insertion/extraction properties and stable redox potential, with maintaining its crystal structure, and also which has many nitrogens introduced therein.

FIG. 1 is a view showing an example of the electrode active material production method of the present invention. In FIG. 1, first, a lithium cobalt oxide having a fluorine introduced therein [lithium-transition metal complex oxide (a) having a fluorine introduced therein] is synthesized by firing a material comprising lithium carbonate ($Li_2CO_3$), lithium fluoride (LiF) and cobalt oxide ($Co_3O_4$) (fluorine introduction step). Next, a lithium cobalt oxide having a layered rock salt structure or spinel structure and a fluorine and nitrogen introduced therein [lithium-transition metal complex oxide (c) having a fluorine and nitrogen introduced therein] is synthesized by firing a material composition comprising the above-obtained lithium cobalt oxide having a fluorine introduced therein [lithium-transition metal complex oxide (a) having a fluorine introduced therein] and urea [nitriding agent (b)] (nitrogen introduction step). Then, the urea still remaining is removed by heating the lithium cobalt oxide having a fluorine and nitrogen introduced therein obtained in the nitrogen introduction step (nitriding agent removal step).

Hereinafter, the steps of the electrode active material production method of the present invention will be explained.

[Nitrogen Introduction Step and Fluorine Introduction Step]

The nitrogen introduction step is a step of synthesizing the lithium-transition metal complex oxide (c) having a layered rock salt structure or spinel structure and a fluorine and nitrogen introduced therein, by firing the material composition comprising the lithium-transition metal complex oxide (a) having a fluorine introduced therein and the nitriding agent (b) being represented by the above formula (1) and being solid or liquid at ordinary temperature.

The lithium-transition metal complex oxide (a) having a fluorine introduced therein (hereinafter may be referred to as F-introduced lithium-transition metal complex oxide (a)) is not particularly limited as long as a part of oxygens in the lithium-transition metal complex oxide (a) are replaced with fluorines. Examples of such a lithium-transition metal complex oxide include a lithium-transition metal complex oxide having the layered rock salt structure as represented by the above-described general formula (2) and a fluorine introduced therein, and a lithium-transition metal complex oxide having the spinel structure as represented by the general formula (3) and a fluorine introduced therein.

Preferred is at least one kind of lithium-transition metal complex oxide having a layered rock salt structure, being selected from the group consisting of $LiCoO_2$, $LiNiO_2$, Li(Ni, Mn)$O_2$, Li(Ni, Mn, Co)$O_2$ and $LiMn_2O_4$, and having a fluorine introduced therein. More preferred is $LiCoO_2$ having a fluorine introduced therein.

The F-introduced lithium-transition metal complex oxide (a) can be in the form of particles (powder) or in the form of a thin film; however, it is preferably in the form of particles. This is because when it is in the form of particles, unlike a thin film, peeling and cracks do not occur and excellent durability is obtained. The average particle diameter of the particulate F-introduced lithium-transition metal complex oxide (a) is preferably 100 nm or more, more preferably 2 μm or more, still more preferably 4 μm or more, while it is preferably 100 μm or less, more preferably 50 μm or less, still more preferably 20 μm or less. The average particle diameter of the F-introduced lithium-transition metal complex oxide (a) can be calculated with a laser diffraction particle size distribution analyzer.

The specific surface area of the F-introduced lithium-transition metal complex oxide (a) is preferably 0.1 $m^2$/g or more, more preferably 0.5 $m^2$/g or more, while it is preferably 300 $m^2$/g or less, more preferably 100 $m^2$/g or less. The specific surface area of the F-introduced lithium-transition metal complex oxide (a) can be calculated by the BET method (gas adsorption method).

There is a possibility that a particulate F-introduced lithium-transition metal complex oxide (a) having the same particle diameter as above can be obtained by forming a thin film of F-introduced lithium-transition metal complex oxide (a) by a conventional sputtering or deposition method and then shaving the thin film. However, the specific surface area of such particles is small since they are formed from a thin film with a small number of convexoconcaves. In contrast, an F-introduced lithium-transition metal complex oxide (a) obtained by the method explained in the fluorine introduction step described below, generally has convexoconcaves on the surface thereof; therefore, the particle has a relatively large specific surface area in the above-described range.

The F-introduced lithium-transition metal complex oxide (a) can be synthesized by a fluorine introduction step as described below, for example. Hereinafter, the fluorine introduction step will be described.

<Fluorine Introduction Step>

The fluorine introduction step is a step of synthesizing the F-introduced lithium-transition metal complex oxide (a) by firing a material comprising a lithium element, a transition metal element, a fluorine element and an oxygen element.

The material used in the fluorine introduction step is not particularly limited as long as it comprises a lithium element, a transition metal element, a fluorine element and an oxygen element. For example, there may be mentioned a material mixture comprising at least a lithium compound, a transition metal compound and a fluorine compound (hereinafter may be referred to as material mixture (A-1)).

The oxygen element contained in the material used in the fluorine introduction step, can be supplied by using a compound which contains an oxygen element as at least one of the compounds constituting the material mixture and from the oxygen-containing compound, or it can be supplied from oxygen contained in the reaction atmosphere in the fluorine introduction step. In general, it is preferable to use the oxygen-containing compound as a compound which is a constituent of the material mixture. In particular, for example, the oxygen-containing compound is used as at least one of the compounds constituting the material mixture (A-1), which are a lithium compound, a transition metal compound and a fluorine compound.

In the case of using the material mixture (R-1) as a material, the lithium compound is not particularly limited as long as it is a compound comprising a lithium element. However, it is preferably a compound which comprises a lithium element and an oxygen element and which functions as both a lithium element supply source and an oxygen element supply source. Concrete examples of the lithium compound include lithium carbonate, lithium nitrate, lithium acetate, lithium oxide and lithium hydroxide. The lithium hydroxide can be a hydrate or anhydride.

The fluorine compound is not particularly limited as long as it is a compound comprising a fluorine element. Concrete examples of the fluorine compound include lithium fluoride.

The transition metal compound is not particularly limited as long as it is a compound comprising a transition metal element. However, it is preferably a compound which comprises a transition metal element and an oxygen element and which functions as both a transition metal element supply source and an oxygen element supply source. As the transition metal element, there may be mentioned those listed above as the transition metal comprising the lithium-transition metal complex oxide. Concrete examples of the transition metal compound include cobalt oxide, cobalt carbonate, cobalt nitrate, cobalt acetate and cobalt hydroxide.

In the case of using the material mixture (A-1) as a material, it is also possible to use an oxygen compound comprising an oxygen element, in addition to the above-described lithium compound, fluorine compound and transition metal compound.

In the case of using the material mixture (A-1) as a material, the lithium compound, transition metal compound and fluorine compound can be separate compounds, or a compound comprising two or more kinds of elements selected from the group consisting of a lithium element, transition metal element and fluorine element, can be used.

In the fluorine introduction step, the ratio of each compound contained in the material mixture can be appropriately determined, depending on the composition of the target F-introduced lithium-transition metal complex oxide (a).

In the fluorine introduction step, the material can be produced by mixing the compounds constituting the material mixture. In the material production, the method for mixing the compounds is not particularly limited. However, a mechanical milling method is preferred in the present invention. By using the mechanical milling method, it is possible to grind and mix the components of the material at the same time and to increase the contact area between the components.

The mechanical milling method can be one which involves a synthesis reaction or one which does not involve a synthesis reaction. Here, "synthesis reaction" refers to a synthesis reaction which synthesizes a material compound. Therefore, the mechanical milling method which involves a synthesis reaction can be used in the case where the material is a material mixture.

In the case of performing mechanical milling by a ball mill method, the rotation speed is, for example, preferably in the range of 100 rpm to 11,000 rpm, more preferably in the range of 500 to 5,000 rpm. The processing time is not particularly limited and can be appropriately determined.

In the fluorine introduction step, the condition of firing the material is not particularly limited as long as it is possible to synthesize the F-introduced lithium-transition metal complex oxide (a). In particular, the firing temperature is preferably equal to or more than the decomposition temperature of each material and can be appropriately determined depending on the decomposition temperatures of the materials to be used. In general, it is preferably 500° C. or more, more preferably 600° C. or more, while it is preferably 900° C. or less, more preferably 800° C. or less. The firing time can be appropriately determined. However, in general, it is preferably 30 minutes or more, more preferably 60 minutes or more, while it is preferably 48 hours or less, more preferably 24 hours or less.

In the fluorine introduction step, the firing atmosphere is not particularly limited. However, examples of the firing atmosphere include an air atmosphere; an inert atmosphere such as nitrogen atmosphere or argon atmosphere; a reduction atmosphere such as ammonia atmosphere or hydrogen atmosphere; and a vacuum. Preferred are an inert atmosphere, reduction atmosphere and vacuum, and more preferred is a reduction atmosphere. This is because it is possible to prevent oxidation degradation of the F-introduced lithium-transition metal complex oxide (a).

In the present invention, the F-introduced lithium-transition metal complex oxide (a) is not limited to one synthesized in the above fluorine introduction step, and it can be one obtained by other synthesis method.

Next, the nitriding agent (b) used in the nitrogen introduction step will be explained.

The nitriding agent (b) used in the present invention is represented by the above formula (1). In the above formula (1), $R^1$, $R^2$ and $R^3$ can be the same to or different from each other. Preferably, at least one of $R^1$, $R^2$ and $R^3$ has a carbon (C).

The nitriding agent (b) is solid or liquid at ordinary temperature (25° C.). Because the nitriding agent (b) is solid or liquid, it is possible to produce a material composition in which the nitriding agent (b) is in physical and effective contact with the F-introduced lithium-transition metal complex oxide (a), so that there is an increase in the efficiency of nitridation of the material composition. In the case of using a gas such as ammonia as the nitriding agent, it is needed to pay attention to such possibilities that a nitriding reaction is unlikely to occur; high corrosivity; and high equipment costs.

Concrete examples of the nitriding agent (b) include urea, methylamine, ethylamine, diethylamine, triethylamine, aniline, nicotine and cyclohexylamine. Preferred is urea. When the nitriding agent is urea, in the formula (1), two of $R^1$ to $R^3$ are H each, and the remaining one is —$CONH_2$.

In the nitrogen introduction step, the ratio of the F-introduced lithium-transition metal complex oxide (a) and nitriding agent (b) contained in the material composition can be appropriately determined, depending on the composition of the target lithium-transition metal complex oxide (c) having a fluorine and nitrogen introduced therein (hereinafter may be referred to as F- and N-introduced lithium-transition metal complex oxide (c)). However, in general, it is preferable that the ratio of N contained in the nitriding agent (b) is 10 to 100 parts by mole, more preferably 30 to 60 parts by mole, relative to 100 parts by mole of lithium contained in the F-introduced lithium-transition metal complex oxide (a).

In the present invention, it is important that the F-introduced lithium-transition metal complex oxide (a) is in well contact with the nitriding agent (b) before firing. When the ratio of the nitriding agent (b) is too large, no sufficient nitridation occurs in the part which is not in contact with the F-introduced lithium-transition metal complex oxide (a). Therefore, there is a possibility that as a whole, the use efficiency of the nitriding agent is reduced.

In the nitrogen introduction step, the material composition can be produced by mixing the F-introduced lithium-transition metal complex oxide (a) and the nitriding agent (b), which are constituents of the material composition, and other component as needed. In the material composition production, the mixing method is not particularly limited. However, a mechanical milling method is preferred in the present invention. By using the mechanical milling method, it is possible to grind and mix the components of the material composition at the same time and to increase the contact area between the components.

The mechanical milling method can be one which involves a synthesis reaction or one which does not involve a synthesis reaction.

In the case of performing mechanical milling by a ball mill method, the rotation speed is, for example, preferably in the range of 100 rpm to 11,000 rpm, more preferably in the range of 500 to 5,000 rpm. The processing time is not particularly limited and can be appropriately determined.

In the nitrogen introduction step, the condition of firing the material composition is not particularly limited as long as it is possible to synthesize the F- and N-introduced lithium-transition metal complex oxide (c). In particular, the firing temperature is preferably equal to or more than the temperature at which the nitriding agent (b) is decomposed or dissolved. That is, the firing temperature can be appropriately determined depending on the nitriding agent (b) to be used. In general, it is preferably 300° C. or more, more preferably 400° C. or more, while it is preferably 600° C. or less, more preferably 500° C. or less. The firing time can be appropriately determined. However, in general, it is preferably 30 minutes or more, more preferably 60 minutes or more, while it is preferably 48 hours or less, more preferably 24 hours or less.

In the nitrogen introduction step, the firing atmosphere is not particularly limited. However, examples of the firing atmosphere include an air atmosphere; an inert atmosphere such as nitrogen atmosphere or argon atmosphere; a reduction atmosphere such as ammonia atmosphere or hydrogen atmosphere; and a vacuum. Preferred are an inert atmosphere, reduction atmosphere and vacuum, and more preferred is a reduction atmosphere. This is because it is possible to prevent oxidation degradation of the F-introduced lithium-transition metal complex oxide (a) and the F- and N-introduced lithium-transition metal complex oxide (c).

[Nitriding Agent Removal Step]

The nitriding agent removal step is a step of removing the nitriding agent (b) still remaining by heating the thus-obtained F- and N-introduced lithium-transition metal complex oxide (c) after the nitrogen introduction step. In the production step of the present invention, the nitriding agent removal step is not essential. However, if excess nitriding agent (b) remains in the F- and N-introduced lithium-transition metal complex oxide (O), there is a possibility that the remaining nitriding agent (b) is dissolved in a liquid electrolyte and causes a problem of deterioration of battery properties. Therefore, it is preferable to establish a nitriding agent removal step.

In the nitriding agent removal step, the condition of heating the F- and N-introduced lithium-transition metal complex oxide (c) is not particularly limited as long as it is possible to remove the nitriding agent (b) used in the nitrogen introduction step. In particular, the heating is preferably performed at a temperature which is equal to or more than the decomposition temperature of the nitriding agent (b) used in the nitrogen introduction step. That is, the heating temperature can be appropriately determined depending on the nitriding agent (b) used in the nitrogen introduction step. In general, it is preferably 200° C. or more, more preferably 300° C. or more, while it is preferably 800° C. or less, more preferably 600° C. or less, still more preferably 500° C. or less, from the viewpoint of preventing de-doping of the introduced nitrogens and fluorines. The heating time can be appropriately determined. However, in general, it is preferably 30 minutes or more, more preferably 60 minutes or more, while it is preferably 48 hours or less, more preferably 24 hours or less.

As explained above, the electrode active material provided by the present invention can be used as a positive or negative electrode active material. Particularly, it is suitably used as a positive electrode active material. Hereinafter, a battery comprising the electrode active material of the present invention will be explained, by way of an example of a lithium secondary battery using the electrode active material of the present invention as a positive electrode active material.

As the structure of a lithium secondary battery, for example, there may be mentioned a lithium battery comprising a positive electrode active material layer comprising a positive electrode active material, a negative electrode active material layer comprising a negative electrode active material, and an electrolyte layer formed between the positive and negative electrode active material layers, the positive electrode active material being the electrode active material of the present invention.

Figure 2:
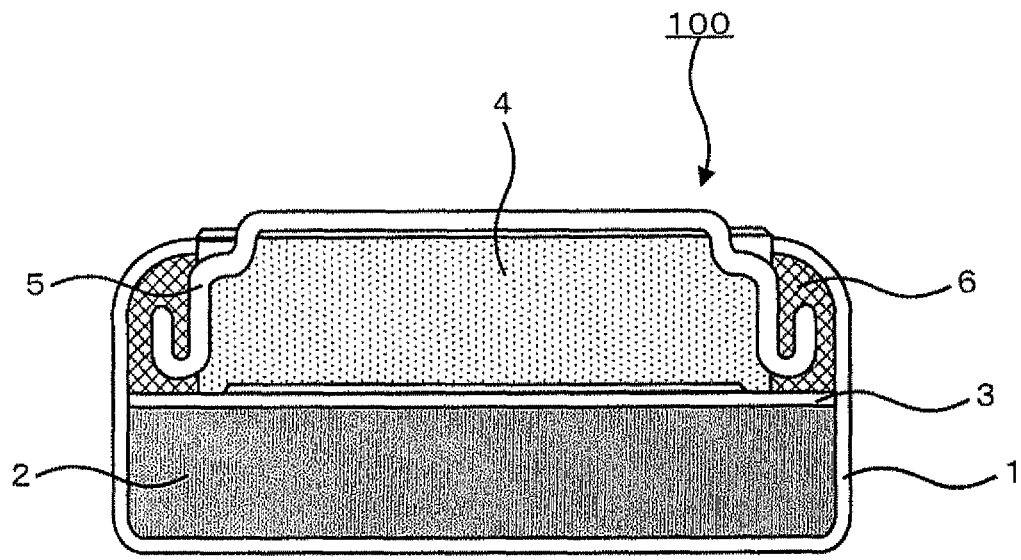
FIG. 2 is a schematic sectional view showing an example of the structure of a lithium secondary battery.

More specifically, there may be mentioned a lithium secondary battery as shown in FIG. 2, for example. In lithium secondary battery 100 shown in FIG. 2, positive electrode active material layer 2 is present inside positive electrode can 1. Negative electrode active material layer 4 is present on positive electrode active material layer 2 via electrolyte layer 3. Negative electrode active material layer 4 is filled inside negative electrode cap 5, and negative electrode cap 5 is set in positive electrode can 1, thus forming a battery structure of positive electrode active material layer 2-electrolyte layer 3-negative electrode active material layer 4. The inside of positive electrode can 1 and that of negative electrode cap 5 are kept airtight with gasket 6.

By using the electrode active material having excellent electron conductivity of the present invention, it becomes possible to relatively decrease the used amount of an electron conduction assisting material, with maintaining lithium conductivity. Therefore, it is possible to increase the capacity of a battery.

Hereinafter, the layers constituting the lithium battery will be explained.

First, the positive electrode active material layer will be explained. The positive electrode active material layer is a layer which comprises at least the electrode active material of the present invention as a positive electrode active material and, as needed, it can comprise at least one selected from the group consisting of an electron conduction assisting material, a binder component and a solid electrolyte material. Especially in the case where the electrolyte layer is a liquid electrolyte layer, the positive electrode active material layer preferably comprises a binder component. This is because it is possible to effectively prevent the positive electrode active material from falling from the positive electrode active material layer. In the case where the electrolyte layer is a solid electrolyte layer, the positive electrode active material layer preferably comprises a solid electrolyte material. This is because it is possible to increase the lithium ion conductivity of the positive electrode active material layer.

The electrode active material of the present invention, which is used as a positive electrode active material, was described above, so that it will not be explained here.

The electron conduction assisting material is not particularly limited as long as it has a desired electron conductivity. For example, there may be mentioned electron conduction assisting materials comprising carbonaceous materials, such as acetylene black, carbon black, coke, carbon fibers and graphite. Preferred are graphite, carbon fibers having an average particle diameter of 1 μm or less, and coke having an average particle diameter of 10 μm or less and heat-treated at a temperature of 800° C. to 2,000° C. The BET specific surface area of the electron conduction assisting material measured by $N_2$ adsorption is preferably 10 m$^2$/g or more.

Preferably, the binder component is chemically and electrically stable. Concrete examples thereof include fluorine-containing binder components such as polyvinylidene fluoride (PVDF) and polytetrafluoroethylene (PTFE) and rubber-based binder components such as styrene-butadiene rubber.

The solid electrolyte material is not particularly limited as long as it has lithium ion conductivity. For example, there may be mentioned a solid oxide electrolyte material and a solid sulfide electrolyte material. Preferred is a solid sulfide electrolyte material. This is because it is possible to obtain a high-power battery with high lithium ion conductivity. The solid electrolyte material will be explained below in detail, in the description of the electrolyte layer.

The amount of the positive electrode active material contained in the positive electrode active material layer is preferably as large as possible, from the viewpoint of capacity. For example, it is preferably in the range of 60% by weight to 99% by weight, more preferably in the range of 70% by weight to 95% by weight. The amount of the electron conduction assisting material contained in the positive electrode active material is preferably as small as possible, as long as it is possible to obtain a desired electron conductivity. For example, it is preferably in the range of 1% by weight to 30% by weight. The amount of the binder component contained in the positive electrode active material is preferably as small as possible, as long as it is possible to stably immobilize the positive electrode active material, etc. For example, it is preferably in the range of 1% by weight to 30% by weight. The amount of the solid electrolyte material contained in the positive electrode active material is preferably as small as possible, as long as it is possible to obtain a desired electron conductivity. For example, it is preferably in the range of 1% by weight to 40% by weight.

The thickness of the positive electrode active material layer varies depending on the structure of a lithium battery. For example, it is preferably in the range of 0.1 μm to 1,000 μm.

Next, the negative electrode active material layer will be explained. The negative electrode active material layer is a layer which comprises at least a negative electrode active material and, as needed, it can comprise at least one selected from the group consisting of an electron conduction assisting material, a binder component and a solid electrolyte material.

As the negative electrode active material, there may be mentioned metallic active materials and carbonaceous active materials. Examples of the metallic active materials include Li, In, Al, Si and Sn. Examples of the carbonaceous active materials include mesocarbon microbeads (MGMB), highly oriented graphite (HOPG), hard carbon and soft carbon. The negative electrode active material can be in the form of a film or particles. In the former case, generally, the negative electrode active material itself is a negative electrode active material. In the case where the negative electrode active material is in the form of particles, the average particle diameter of the negative electrode active material is preferably in the range of 1 nm to 100 μm, more preferably in the range of 10 nm to 30 μm, for example. Also in the case where the negative electrode active material is in the form of particles, the specific surface area of the negative electrode active material is preferably in the range of 0.1 m$^2$/g to 10 m$^2$/g, for example.

When the negative electrode active material is in the form of particles, as needed, the negative electrode active material layer can comprise at least one selected from the group consisting of an electron conduction assisting material, a binder component and a solid electrolyte material, in addition to the particulate negative electrode active material.

In this case, the amount of the negative electrode active material contained in the negative electrode active material layer is preferably as large as possible, from the viewpoint of capacity. For example, it is preferably in the range of 60% by weight to 99% by weight, more preferably in the range of 70% by weight to 95% by weight. The amount of the electron conduction assisting material contained in the negative electrode active material layer is preferably as small as possible, as long as it is possible to obtain a desired electron conductivity. For example, it is preferably in the range of 1% by weight to 30% by weight. The amount of the binder component contained in the negative electrode active material layer is preferably as small as possible, as long as it is possible to stably immobilize the negative electrode active material, etc. For example, it is preferably in the range of 1% by weight to 30% by weight. The amount of the solid electrolyte material contained in the negative electrode active material layer is preferably as small as possible, as long as it is possible to obtain a desired electron conductivity. For example, it is preferably in the range of 1% by weight to 40% by weight.

The electron conduction assisting material, binder component and solid electrolyte material which are used in the negative electrode active material layer, will not be described here since they are the same as those used in the above-described positive electrode active material layer.

The thickness of the negative electrode active material layer varies depending on the structure of a lithium battery. For example, it is preferably in the range of 0.1 μm to 1,000 μm.

Next, the electrolyte layer will be described. The electrolyte layer is a layer formed between the positive and negative electrode active material layers. Li ion conduction occurs between the positive and negative electrode active materials through the electrolyte contained in the electrolyte layer. The form of the electrolyte layer is not limited. For example, there may be mentioned a liquid electrolyte layer, a gel electrolyte layer and a solid electrolyte layer.

The liquid electrolyte layer is generally a layer comprising a non-aqueous liquid electrolyte. In general, the non-aqueous liquid electrolyte of a lithium battery comprises a lithium salt and a non-aqueous solvent. Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the non-aqueous solvent include ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof. The concentration of the lithium salt in the non-aqueous liquid electrolyte is in the range of 0.5 mol/L to 3 mol/L, for example. In the present invention, low-volatile liquids are also usable as the non-aqueous liquid electrolyte, such as an ionic liquid.

The gel electrolyte layer can be obtained by, for example, adding a polymer to the non-aqueous liquid electrolyte for gelation. In particular, gelation can be performed by adding a polymer such as polyethylene oxide (PEO), polyacrylonitrile (PAN) or polymethyl methacrylate (PMMA) to the non-aqueous liquid electrolyte.

The solid electrolyte layer is a layer comprising a solid electrolyte material. As the solid electrolyte material, for example, there may be mentioned a solid oxide electrolyte material and a solid sulfide electrolyte material. Preferred is a solid sulfide electrolyte material. This is because it is possible to obtain a high-power battery with high Li ion conductivity.

The solid sulfide electrolyte material is not particularly limited as long as it has Li and S and has Li ion conductivity. For example, there may be mentioned one having Li, S and a third component A. As the third component A, for example, there may be mentioned at least one kind selected from the group consisting of P, Ge, B, Si, I, Al, Ga and As.

It is particularly preferable that the solid sulfide electrolyte material is a compound comprising $Li_2S$ and MS, which is a sulfide other than $Li_2S$. Concrete examples of such a compound include an $Li_2S$—$P_2S_5$ compound, an $Li_2S$-$SiS_2$ compound and an $Li_2S$—$GeS_2$ compound. Preferred is an $Li_2S$—$P_2S_5$ compound because of its high Li ion conductivity. When the mole ratio of $Li_2S$ and the sulfide MS is $xLi_2S$-$(100-x)$ MS, it is preferable that x satisfies $50 \leq x \leq 95$, and it is more preferable that x satisfies $60 \leq x \leq 85$.

The $Li_2S$—$P_2S_5$ compound means a solid sulfide electrolyte material comprising $Li_2S$ and $P_2S_5$. The same applies to other compounds.

An amorphous $Li_2S$—$P_2S_5$ compound can be obtained by, for example, using $Li_2S$ and $P_2S_5$ and performing a mechanical milling method or a melting and rapid-quenching method.

The solid sulfide electrolyte material can be amorphous or crystalline. A crystalline solid sulfide electrolyte material can be obtained by, for example, firing an amorphous solid sulfide electrolyte material. The solid sulfide electrolyte material preferably has a bridging sulfur. This is because such a solid sulfide electrolyte material has high Li ion conductivity.

As the solid sulfide electrolyte material, $Li_7P_3S_{11}$ is particularly preferred. This is because of its high Li ion conductivity.

The average particle diameter of the solid electrolyte material is preferably in the range of 1 nm to 100 μm, more preferably in the range of 10 nm to 30 μm, for example.

The thickness of the electrolyte layer varies depending on the structure of a lithium battery. For example, it is preferably in the range of 0.1 μm to 1,000 μm, more preferably in the range of 0.1 μm to 300 μm.

A lithium battery comprises at least the above-described positive electrode active material, electrolyte layer and negative electrode active material layer. In addition, it further comprises a positive electrode current collector for collecting current from the positive electrode active material layer and a negative electrode current collector for collecting current from the negative electrode active material layer. As the material of the positive electrode current collector, for example, there may be mentioned SUS, aluminum, nickel, iron, titanium and carbon. Preferred is SUS. As the material of the negative electrode current collector, for example, there may be mentioned SUS, copper, nickel and carbon. Preferred is SUS. It is preferable to appropriately determine the thickness, shape, etc., of the positive and negative electrode current collectors, depending on the intended use of the lithium battery.

The lithium battery can have a separator between the positive and negative electrode active material layers. This is because it is possible to obtain a highly safe lithium battery. As the material of the separator, for example, there may be mentioned porous films of polyethylene, polypropylene, cellulose and polyvinylidene fluoride, and nonwoven fabrics such as a resin nonwoven fabric and a glass fiber nonwoven fabric.

As a battery case for storing the lithium battery, it is possible to use a general battery case for lithium batteries. As the battery case, for example, there may be mentioned a battery case made of SUS. When the lithium battery is an all-solid battery, it is possible to form a power generation element inside an insulation ring.

EXAMPLES

Example 1

Synthesis of F- and N-Introduced Lithium Cobalt Oxide

The F- and N-introduced lithium cobalt oxide was synthesized by the process shown in FIG. 1.

<Fluorine Introduction Step>

$Li_2CO_3$ (manufactured by Wako Pure Chemical Industries, Ltd.) of 7.565 g, LiF (Wako Pure Chemical Industries, Ltd.) of 1.770 g and $Co_3O_4$ (Wako Pure Chemical Industries, Ltd.) of 20.868 g were mixed with a mortar. Then, the thus-obtained material mixture was fired (kept at 900° C. for 20 hours, temperature increase rate 5° C./min) in a container in the air (synthesis of F-introduced $LiCoO_2$).

<Nitrogen Introduction Step>

Next, the above-synthesized F-introduced lithium cobalt oxide (F-introduced $LiCoO_2$) of 1 g and urea (manufactured by Aldrich Co.) of 1 g were mixed with a mortar to obtain a material composition. The thus-obtained material composition was fired (kept at 500° C. for 6 hours, temperature increase rate 5° C./min) in a vacuum container (synthesis of F- and N-introduced $LiCoO_2$).

<Remaining Urea Removal Step>

After the container was opened to the air, it was kept again at 750° C. for 6 hours (temperature increase rate 5° C./min) to remove urea.

(Evaluation of F- and N-Introduced Lithium Cobalt Oxide)

<Crystal Structure>

The crystal structure of the above-obtained F-introduced lithium cobalt oxide and that of the F- and N-introduced lithium cobalt oxide were confirmed by an XRD measurement. As a result, both of them were found to have a layered rock salt structure.

<Specific Surface Area>

The specific surface area of the obtained F- and N-introduced lithium cobalt oxide was measured by the BET method. As a result, it was found to be 2.3 $m^2$/g. The specific surface area was measured with a fully automated gas sorption analyzer (Autosorb-1 manufactured by Yuasa Ionics Co., Ltd.) for measurement of specific surface area and micropore distribution.

<Electron Conductivity>

Figure 3:
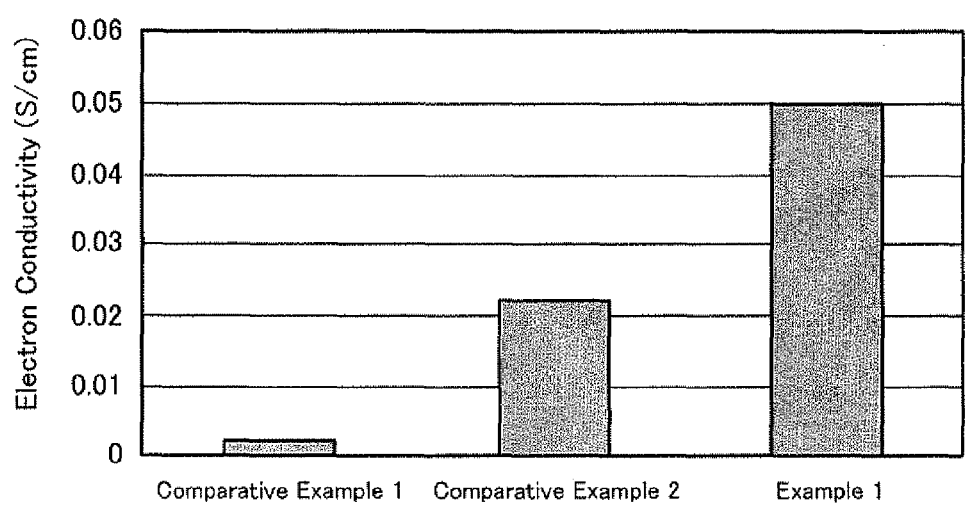
FIG. 3 is a graph showing the results of electron conductivity measurement of Example and Comparative Examples.

The electron conductivity of the obtained F- and N-introduced lithium cobalt oxide was measured by the four-terminal method (impressed voltage 90 V). The result is shown in FIG. 3. The electron conductivity was measured with a powder resistivity measuring device (MCP-PD51 manufactured by Mitsubishi Chemical Analytech Co., Ltd.)

Comparative Example 1

The electron conductivity of $LiCoO_2$ (manufactured by Toda Kogyo Corporation, average particle diameter 2.5 µm) was measured in the same manner as Example 1. The result is shown in FIG. 3.

Comparative Example 2

Synthesis of N-Introduced Lithium Cobalt Oxide $LiCoO_2$ (manufactured by Toda Kogyo Corporation, average particle diameter 2.5 µm) of 1 g and urea (manufactured by Aldrich Co.) were mixed with a mortar. The thus-obtained mixture was fired (kept at 500° C. for hours, temperature increase rate 5° C./min) in a vacuum container.

After the container was opened to the air, it was kept again at 750° C. for 5 hours (temperature increase rate 5° C./min) to remove urea.
(Evaluation of N-Introduced Lithium Cobalt Oxide)

The electron conductivity of the thus-obtained lithium cobalt oxide having a nitrogen introduced therein, was measured in the same manner as Example 1. The result is shown in FIG. 3.
[Evaluation Result]

As shown in FIG. 3, the $LiCoO_2$ having a nitrogen introduced therein (Comparative Example 2) showed an electron conductivity which is ten times higher than that of pure $LiCoO_2$ (Comparative Example 1). The $LiCoO_2$ having a fluorine and nitrogen introduced therein (Example 1) showed an electron conductivity which is two or more times higher than that of Comparative Example 2.

From the above results, it was found that it is possible to significantly increase electron conductivity by introducing nitrogens and fluorines in lithium cobalt oxide, compared to lithium cobalt oxide having only nitrogens introduced therein. This is thought to be because by introducing fluorines in lithium cobalt oxide, a large amount of nitrogens could be introduced therein, with maintaining the crystal structure of the lithium cobalt oxide.

REFERENCE SIGNS LIST

1. Positive electrode can
2. Positive electrode active material layer
3. Electrolyte layer
4. Negative electrode active material layer
5. Negative electrode cap
6. Gasket
100. Lithium secondary battery

The invention claimed is:

1. An electrode active material comprising a lithium-transition metal complex oxide having a layered rock salt structure or spinel structure and a fluorine and nitrogen introduced therein,
wherein the electrode active material has an electron conductivity of $5.0 \times 10^{-2}$ S/cm or more.

2. The electrode active material according to claim 1, wherein the lithium-transition metal complex oxide is at least one kind selected from the group consisting of $LiCoO_2$, $LiNiO_2$, $Li(Ni, Mn)O_2$, $Li(Ni, Mn, Co)O_2$ and $LiMn_2O_4$.

3. The electrode active material according to claim 1, wherein the lithium-transition metal complex oxide is $LiCoO_2$.

4. The electrode active material according to claim 1, wherein the electrode active material has an average particle diameter of 0.1 to 50 µm.

5. The electrode active material according to claim 1, wherein the electrode active material is a positive electrode active material.

6. An electrode active material production method comprising:
synthesizing a lithium-transition metal complex oxide having a fluorine introduced therein, by firing, a material mixture comprising; a lithium compound. a lithium fluoride, a transition metal compound. and an oxygen element; and
synthesizing a lithium-transition metal complex oxide having a layered rock salt structure or spinel structure and a fluorine and nitrogen introduced therein, by firing a material composition comprising the lithium-transition metal complex oxide having a fluorine introduced therein and a nitriding agent, wherein the nitriding agent is represented by the following formula (1) and is solid or liquid at ordinary temperature:

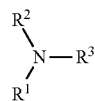

Formula (1)

wherein $R^1$, $R^2$ and $R^3$ are each independently a group having at least one selected from the group consisting of carbon (C), hydrogen (H), oxygen (O) and nitrogen (N).

7. The electrode active material production method according to claim 6, wherein the lithium-transition metal complex oxide having a fluorine introduced therein, is at least one kind of lithium-transition metal complex oxide selected from the group consisting of $LiCoO_2$, $LiNiO_2$, $Li(Ni, Mn)O_2$, $Li(Ni, Mn, Co)O_2$ and $LiMn_2O_4$, and having a fluorine introduced therein.

8. The electrode active material production method according to claim 6, wherein the lithium-transition metal complex oxide having a fluorine introduced therein, is $LiCoO_2$ having a fluorine introduced therein.

9. The electrode active material production method according to claim 6, wherein the lithium compound is at least one kind selected from the group consisting of lithium carbonate, lithium nitrate, lithium acetate, lithium oxide and lithium hydroxide.

10. The electrode active material production method according to claim 6, wherein the transition metal compound is at least one kind selected from the group consisting of cobalt oxide, cobalt nitrate, cobalt acetate, cobalt carbonate and cobalt hydroxide.

11. The electrode active material production method according to claim 6, wherein the nitriding agent is at least one kind selected from the group consisting of urea, methylamine, ethylamine, diethylamine, triethylamine, aniline, nicotine and cyclohexylamine.

12. The electrode active material production method according to claim 6, wherein the firing of the material composition is carried out at a temperature of 300 to 600° C.

13. The electrode active material production method according to claim 6, wherein the firing of the material mixture is carried out at a temperature of 500 to 900° C.

14. The electrode active material production method according to claim 6, further comprising removing the nitriding agent still remaining by heating the lithium-transition metal complex oxide having a fluorine and nitrogen introduced therein.

* * * * *